(12) United States Patent  (10) Patent No.: US 12,180,098 B2
Herbkersman  (45) Date of Patent: Dec. 31, 2024

(54) METHOD AND DEVICE FOR LIMITING ALGAE GROWTH IN CONDENSATE DRAIN LINES

(71) Applicant: William Herbkersman, Bluffton, SC (US)

(72) Inventor: William Herbkersman, Bluffton, SC (US)

(73) Assignee: Always Clear, LLC, Blufton, SC (US)

( * ) Notice: Subject to any disclaimer, the term of this patent is extended or adjusted under 35 U.S.C. 154(b) by 0 days.

(21) Appl. No.: 17/383,008

(22) Filed: Jul. 22, 2021

(65) Prior Publication Data

US 2022/0073385 A1   Mar. 10, 2022

Related U.S. Application Data

(60) Provisional application No. 63/075,629, filed on Sep. 8, 2020.

(51) Int. Cl.
*C02F 1/50* (2023.01)
*A01N 59/00* (2006.01)
(Continued)

(52) U.S. Cl.
CPC .............. *C02F 1/50* (2013.01); *F24F 13/222* (2013.01); *A01N 59/00* (2013.01); *A01N 59/08* (2013.01);
(Continued)

(58) Field of Classification Search
CPC .. F24F 13/222; F24F 13/224; F24F 2013/228; F24F 2013/227; F24F 13/22; A01N 59/00; A01N 63/00; A01N 63/30; A01N 63/32; A01N 63/34; A01N 63/36; A01N 63/38; A01N 63/20; A01N 65/03; A01N 59/08; C02F 1/50; C02F 1/5281;
(Continued)

(56) References Cited

U.S. PATENT DOCUMENTS 3,578,776 A    5/1971  Schneider, Jr. et al.
3,595,786 A *  7/1971  Horvath ................. C02F 1/688
                                                    422/282

(Continued)

FOREIGN PATENT DOCUMENTS

EP           1835236 A1 *  9/2007  ............ F24F 1/0007
WO   WO-2006062182 A1 *  6/2006  ............ B01D 5/009

OTHER PUBLICATIONS

English Machine Translation; WO-2006062182-A1; Nakata et al.; 8 pages (Year: 2006).*

*Primary Examiner* — Magali P Slawski
*Assistant Examiner* — Bernadette Karen McGann
(74) *Attorney, Agent, or Firm* — Kim and Lahey Law Firm, LLC; Douglas W. Kim

(57) ABSTRACT

A device insertable inline in a condensation drain line for preventing algae "plugs" from forming in the drain line. The device has an inlet, an outlet and a reaction chamber therebetween. A charge of algaecide is positioned with respect to the floor of the reaction chamber in a feed channel so that, as condensate enters the inlet of the reaction chamber and is diverted toward the algaecide the algae in the condensate can be killed. Additional flow diverters apply backflow to retain the condensate in contact with the algaecide momentarily before the condensate exist the device and is discharged to the environment.

21 Claims, 7 Drawing Sheets

(51) Int. Cl.
  *A01N 59/08* (2006.01)
  *F24F 13/22* (2006.01)
(52) U.S. Cl.
  CPC ...... *C02F 2303/04* (2013.01); *C02F 2303/20* (2013.01); *F24F 2013/228* (2013.01)
(58) Field of Classification Search
  CPC .. C02F 1/685; C02F 1/68; C02F 1/686; C02F 1/687; C02F 1/688; C02F 1/72; C02F 1/76; C02F 2101/30; C02F 2303/00; C02F 2303/04; C02F 2303/20; C02F 2307/08; C02F 2307/14
  See application file for complete search history.

(56) References Cited

U.S. PATENT DOCUMENTS

| | | | | |
|---|---|---|---|---|
| 4,019,659 A * | 4/1977 | Deneen | ............ | G01F 23/04 222/630 |
| 4,759,907 A * | 7/1988 | Kawolics | ............ | B01J 4/008 422/264 |
| 5,743,287 A * | 4/1998 | Rauchwerger | ............ | B01F 21/22 422/282 |
| 6,281,802 B1 * | 8/2001 | Venable | ............ | C02F 1/688 340/613 |
| 6,895,771 B1 * | 5/2005 | Cantolino | ............ | B01F 25/4231 62/288 |
| 7,392,658 B1 * | 7/2008 | Hardy, III | ............ | F24F 13/222 137/15.05 |
| 8,075,769 B1 * | 12/2011 | Gleason | ............ | C02F 1/688 210/206 |
| 9,273,457 B2 * | 3/2016 | Kent | ............ | E03F 5/14 |
| 9,943,778 B1 * | 4/2018 | Gutierrez | ............ | B01D 5/009 |
| 10,370,181 B1 * | 8/2019 | Plummer | ............ | C02F 1/50 |
| 10,843,937 B1 * | 11/2020 | Mckinney | ............ | C02F 3/2866 |
| 2005/0109793 A1 * | 5/2005 | Thomas | ............ | E04H 4/1281 222/6 |
| 2006/0175264 A1 * | 8/2006 | Ballew | ............ | C02F 1/76 210/764 |
| 2007/0119503 A1 * | 5/2007 | Scaringe | ............ | B60H 1/3233 137/247.41 |
| 2008/0216503 A1 | 9/2008 | Cantolino | | |
| 2013/0306163 A1 | 11/2013 | Hubbard, Sr. et al. | | |
| 2014/0238506 A1 | 8/2014 | Adams et al. | | |
| 2016/0058899 A1 * | 3/2016 | Mansor | ............ | A61L 2/18 422/116 |
| 2019/0071331 A1 | 3/2019 | Italia et al. | | |
| 2020/0070217 A1 | 3/2020 | Rose | | |

* cited by examiner

METHOD AND DEVICE FOR LIMITING ALGAE GROWTH IN CONDENSATE DRAIN LINES

RELATED APPLICATIONS

This application claims the benefit of priority under 35 U.S.C. § 119 (e) of U.S. Provisional Patent Application No. 63/075,629, filed Sep. 8, 2020, the contents of which are incorporated herein by reference in their entirety.

TECHNICAL FIELD

The present disclosure relates generally to maintenance of condensate drain lines associated with air conditioners, refrigerators, ice makers and the like.

BACKGROUND

Drain lines for discharging condensate from air-conditioners, refrigerators, ice makers and other similar appliances tend to accumulate algae. In time, algae-build up can become a significant problem. For example, in air-conditioned apartment buildings with many individual air conditioning units, each of which units with its own condensate drain line, the algae deposits over time can clog the condensate drain lines. If a condensate drain line becomes clogged, the condensate will back up behind the algae plug. Eventually condensate may leak upstream of the plug, and can cause water damage to the floor or to the ceiling of the apartment below. Although the algae clog can be removed by mechanical means—frequently, by using compressed air to blow the plug to the exterior so that condensate flows freely again—the damage will have been done.

There is a need for a better way to manage condensate lines, that is, to keep them open so the condensate flows freely to the exit and, ideally, to enable the condensate lines to be self-cleaning.

SUMMARY

According to its major aspects, the present device, when inserted in the condensate drain line, is useful in keeping condensate drain lines free of algae clogs, as long as the device itself is periodically replenished with an algaecide.

The device is connected in-line with an existing condensate drain line so the condensate stream flows through the device. The device is preferably installed nearer to the condensate source, well upstream from the end of the condensate drain line. The device thus becomes part of a flow path for the condensate, the condensate is treated for algae, and reenters the condensate drain line to continue its path to the environment—before algae concentrations in the drain line become large enough to plug the line.

The interior of the device is configured to facilitate interaction of the condensate with an algaecide. The residency time and flow path of the condensate in the device are designed to facilitate that interaction: that is, the inlet flow is directed by structures within the device toward the algaecide, and the outlet flow is retarded to increase interaction time with the algaecide, thereby facilitating the destruction of the algae and preventing algae from plugging the condensate tube and backing up in the condensate line and potentially damaging floors, ceilings, carpeting, and furniture.

An aspect of the device is a feed channel that contains a charge of algaecide, and holds that algaecide so that it descends to the bottom of the feed channel and into the condensate flow path where the algaecide reacts with the algae present to kill the algae. A charge of algaecide means a fixed quantity in any units of volume or mass, for example, added at one time, and that processes a quantity of algae effectively to preclude algae plugging for a conveniently large amount of time so that maintenance is convenient.

Another aspect of the disclosure is the reaction chamber of the device, which is located below the feed channel. The reaction chamber receives both the inflowing condensate and the descending algaecide in such a way that the algae present in the condensate is exposed to the algaecide and killed. The bottom of the feed channel, being just above the floor of reaction chamber, enables the algaecide at the bottom of the feed channel to mix with the condensate long enough to kill algae present. As the charge of algaecide in the feed channel is gradually used up, it descends further and further, urged by gravity, down the feed channel and into the reaction chamber. Meanwhile, the condensate continues to flow into the inlet of device so that there is always interaction between the algaecide and the condensate. A modest amount of experimentation will reveal the amount of algaecide to use in neutralizing the expected algae content in the condensate.

The feed channel and the corresponding quantity of algaecide are a feature of the application. These may be sized for typical rates of consumption and for specific appliances—such as for the window air conditioner or for mainframe computer rooms—and for the factors that contribute to more condensate flow or greater algae build-up, such as prevailing winds, temperatures, humidity, air quality, and so forth. These factors will inform the design of the present device for different circumstances so that a user will learn to add a new charge of algaecide on a more or less regular interval.

Another aspect of the feed tube is that the algaecide may be a solid or a thick gel that descends by gravity down the feed channel and into the reaction chamber where the lowest portion of the algaecide is exposed to the condensate for treatment. As the algaecide is consumed, the solid charge of algaecide continues to slowly descend down the feed channel until, eventually, it is used up or a new charge of algaecide is added to "top off" the remaining charge. A charge of solid algaecide is convenient to handle, package, and store. The solid may be in the form of a stick, granules, beads, or powder.

An aspect of the device is the reaction chamber where the flow of incoming condensate is guided by flow diverters so condensate flows from the inlet of reaction chamber to the outlet and, along its path, is exposed to the algaecide to permit interaction with the algaecide, namely, killing typical algae to reduce the likelihood that an algae plug will form in the condensate tube.

An aspect of the device is that it includes structures—namely, flow diverters—engineered to cooperate with the inlet and the outlet and feed channel in accomplishing the particular purpose for which the device is intended, namely, one-way flow through the device that effectively exposes condensate to the algaecide.

Also, the device itself is easy to install in the condensate line, preferably, at the beginning of the condensate line, where the device is likely more accessible and the algaecide can easily and conveniently be recharged.

These and other features and their advantages will be apparent to those skilled in the art of condensate drain line maintenance from a careful reading of the present disclosure.

DETAILED DESCRIPTION

Figure 1:
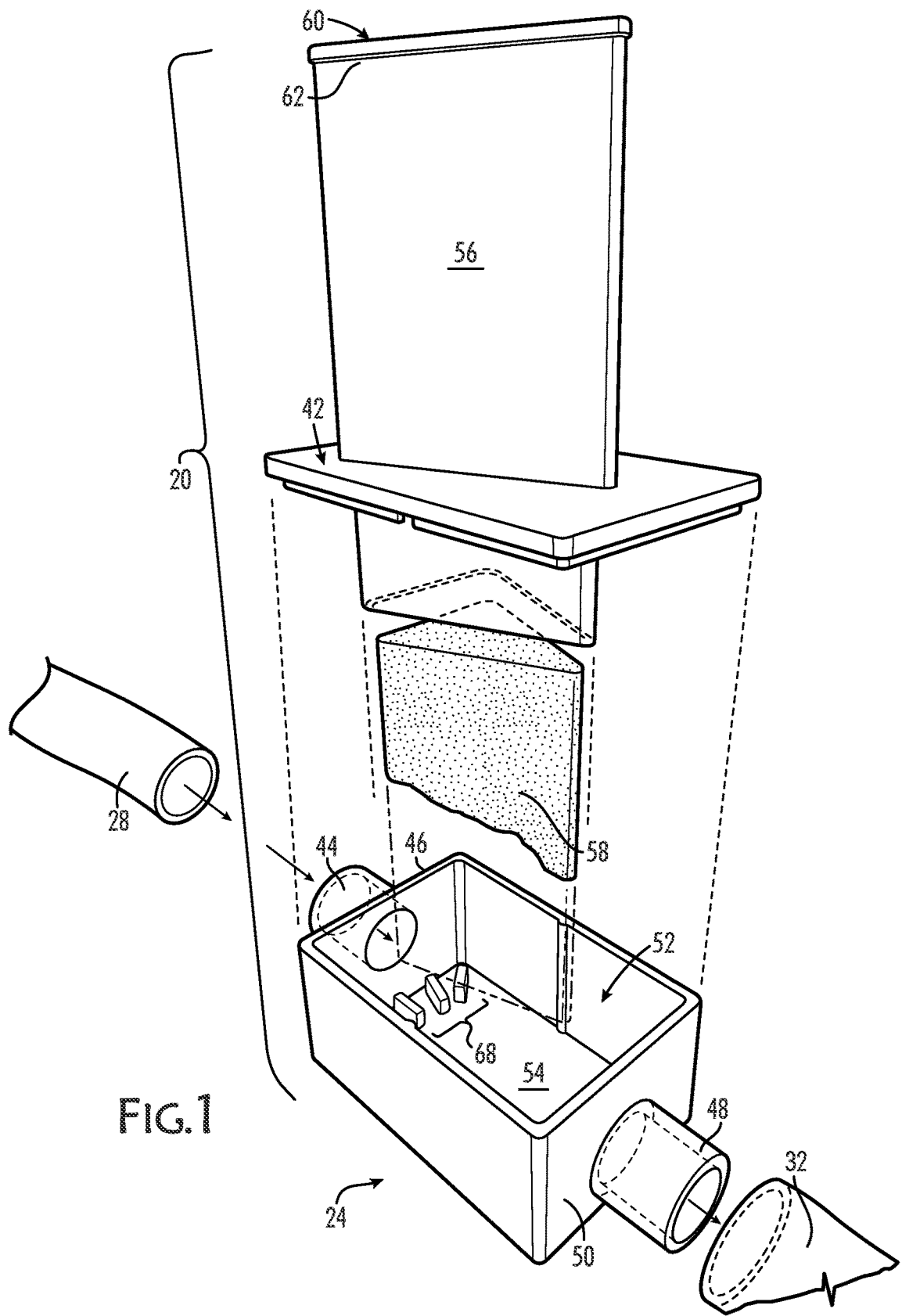
FIG. 1 is an exploded, elevated, perspective view of the present device from the exit end showing the feed tube with a portion of the algaecide (in phantom lines) below it, and, again in phantom lines, the reaction chamber with the condensate diverters near the inlet and the outlet port, according to aspects of the disclosure.
Figure 2:
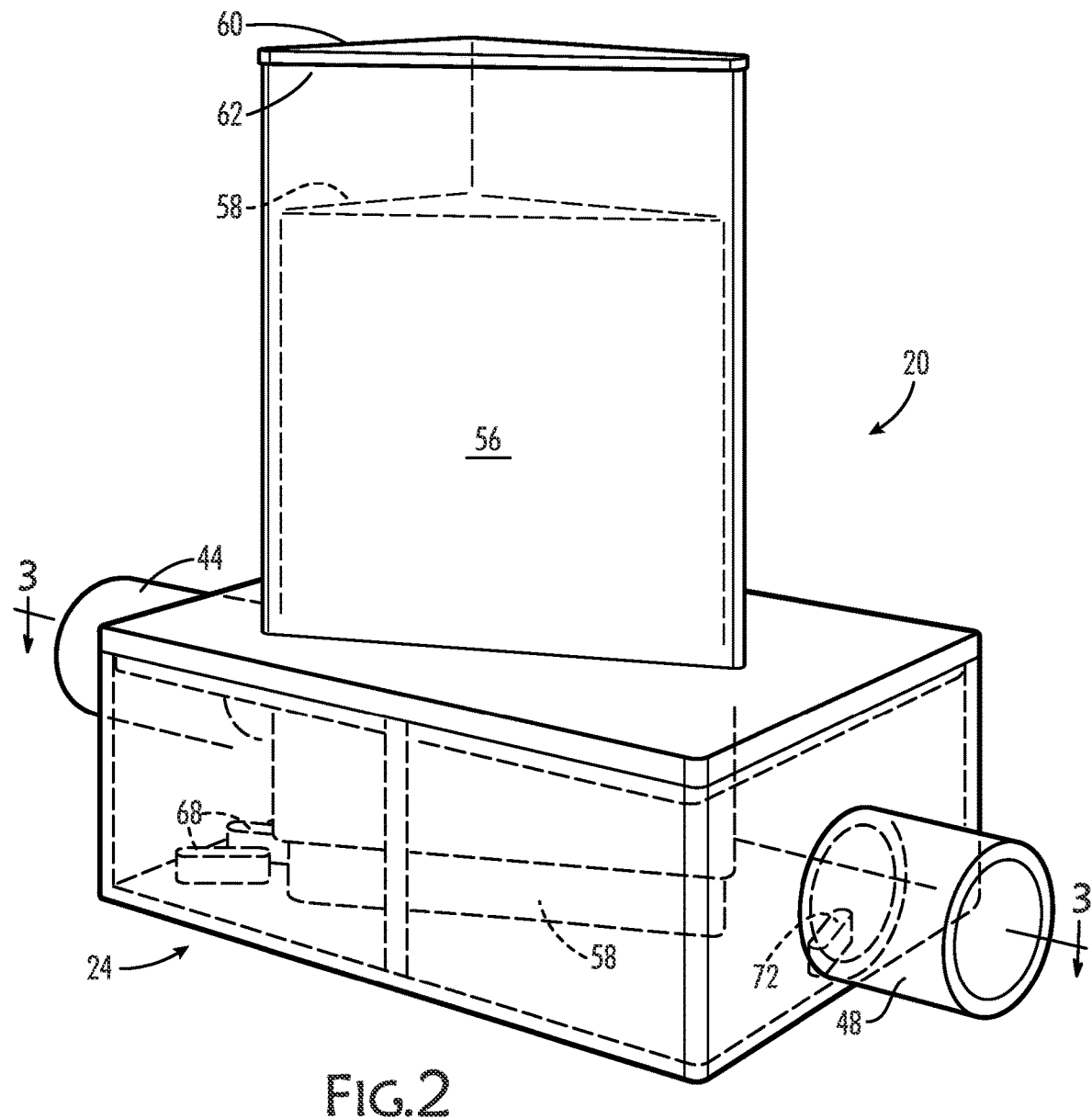
FIG. 2 is an assembled, perspective view of the device of FIG. 1, with interior structures shown in phantom lines, according to an aspect of the disclosure.
Figure 3:
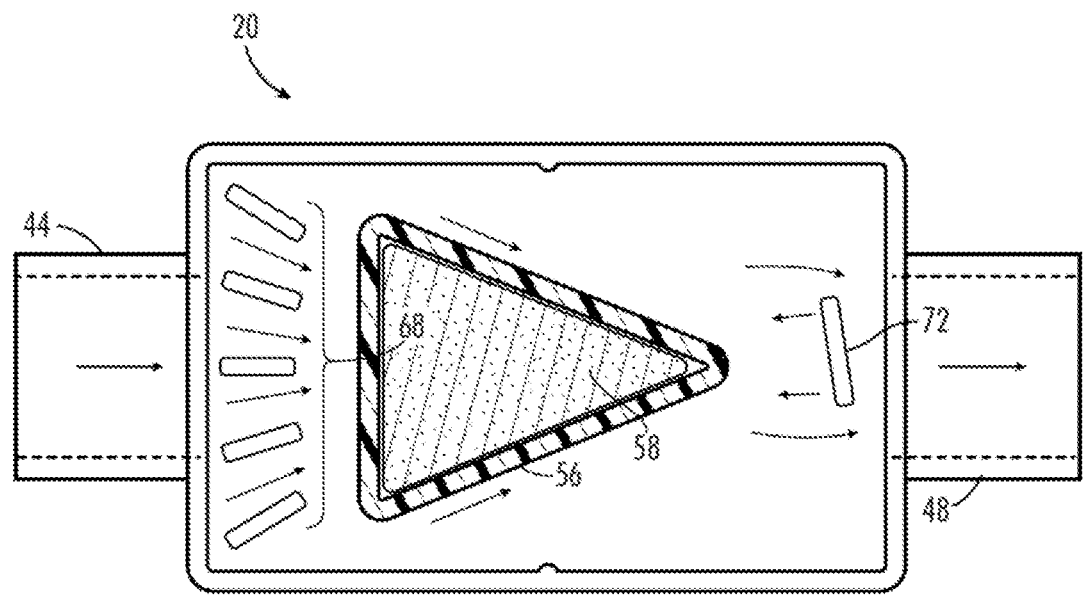
FIG. 3 is a top cross-sectional view of the device that is shown in FIG. 2, taken along lines 3-3 of FIG. 2 and showing condensate flow lines, according to an aspect of the disclosure.

Referring now to the figures, FIG. 1 shows the present device 20 includes a reaction chamber 24 designed to be connected between an upstream condensate line 28 and a downstream condensate line 32, thereby intercepting the condensate for treatment of algae. Reaction chamber 24 may be installed close to the source of the condensate, such as an air conditioner or refrigerator, for example, or it may be attached at a break made in the condensate drain line to intercept condensate where installation is convenient. It is an advantage to receive the condensate closer to the condensate source in mitigating algae plug formation.

Device 20 permits controlled interaction between condensate and an algaecide so as to kill the algae that may be present in the condensate and thereby preclude plugging of condensate drain line 32 by preventing the formation of a mass of algae.

Referring now to FIG. 1, upstream condensate drain line 28 will run from a source of liquid water derived from condensing water vapor. Water vapor condenses as it is chilled, for example, by air conditioning or refrigeration. The condensate is then carried through condensate drain line 28 to the exterior of a building where it is released to the environment. Condensate drain line 28, made of polyvinylchloride (PCV), is drained by gravity. At times more than one drain line may be joined to collect condensation from several sources for release to the environment through one drain line directed to the exterior.

Figure 5:
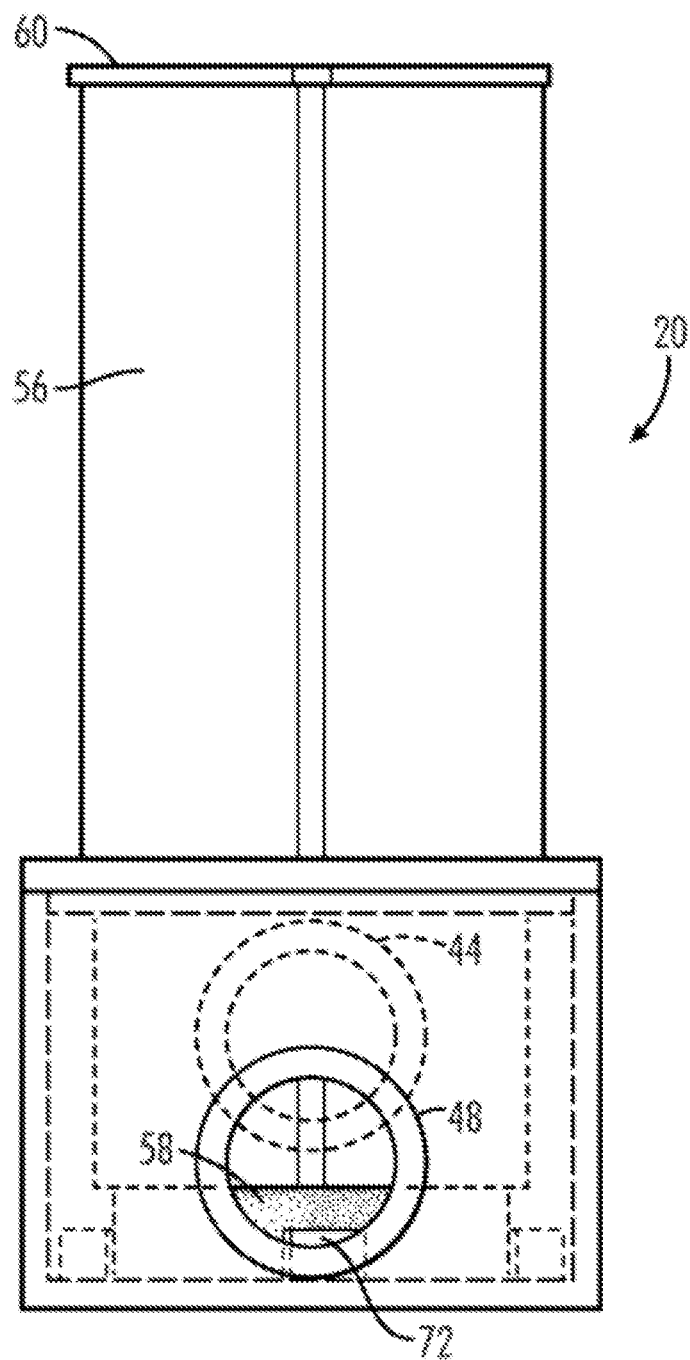
FIG. 5 shows an end view of the device of FIG. 1, with the structure inside the reaction chamber shown in phantom lines, according to an aspect of the disclosure.

Device 20 includes reaction chamber 24 with an inlet 44 on a first side 40 of reaction chamber 24 that receives condensate from upstream condensate line 28 and includes an outlet 48 on a second side 50 of reaction chamber 24 that delivers condensate received from inside reaction chamber 24 to condensate drain line 32 on the other side of reaction chamber 24. The reaction chamber 24 sides 40 and 50 terminate at a reaction chamber top 46 dimensioned to accept a reaction chamber cap 42. To assure flow of condensate between inlet 44 and outlet 48, inlet 44 enters reaction chamber 24 elevated above floor 54 slightly with respect to outlet 48 which is set closer to floor 54 of reaction chamber 24, as best seen in FIG. 5.

Figure 4A:
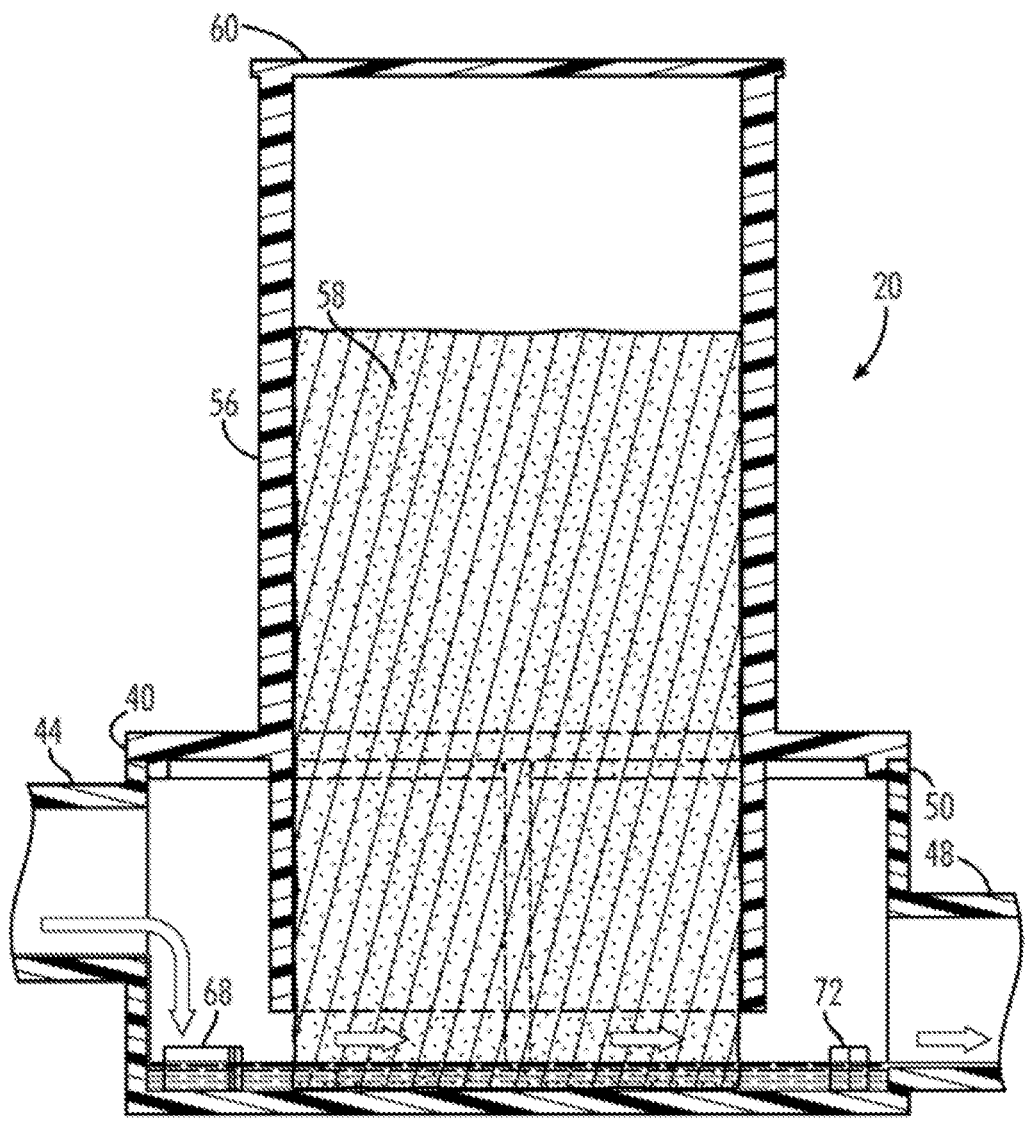
FIG. 4A is a vertical, cross-sectional, left-side view taken along lines 4-4 of FIG. 2, with arrows indicating the direction of condensate flow through the device, according to an aspect of the disclosure.
Figure 4B:
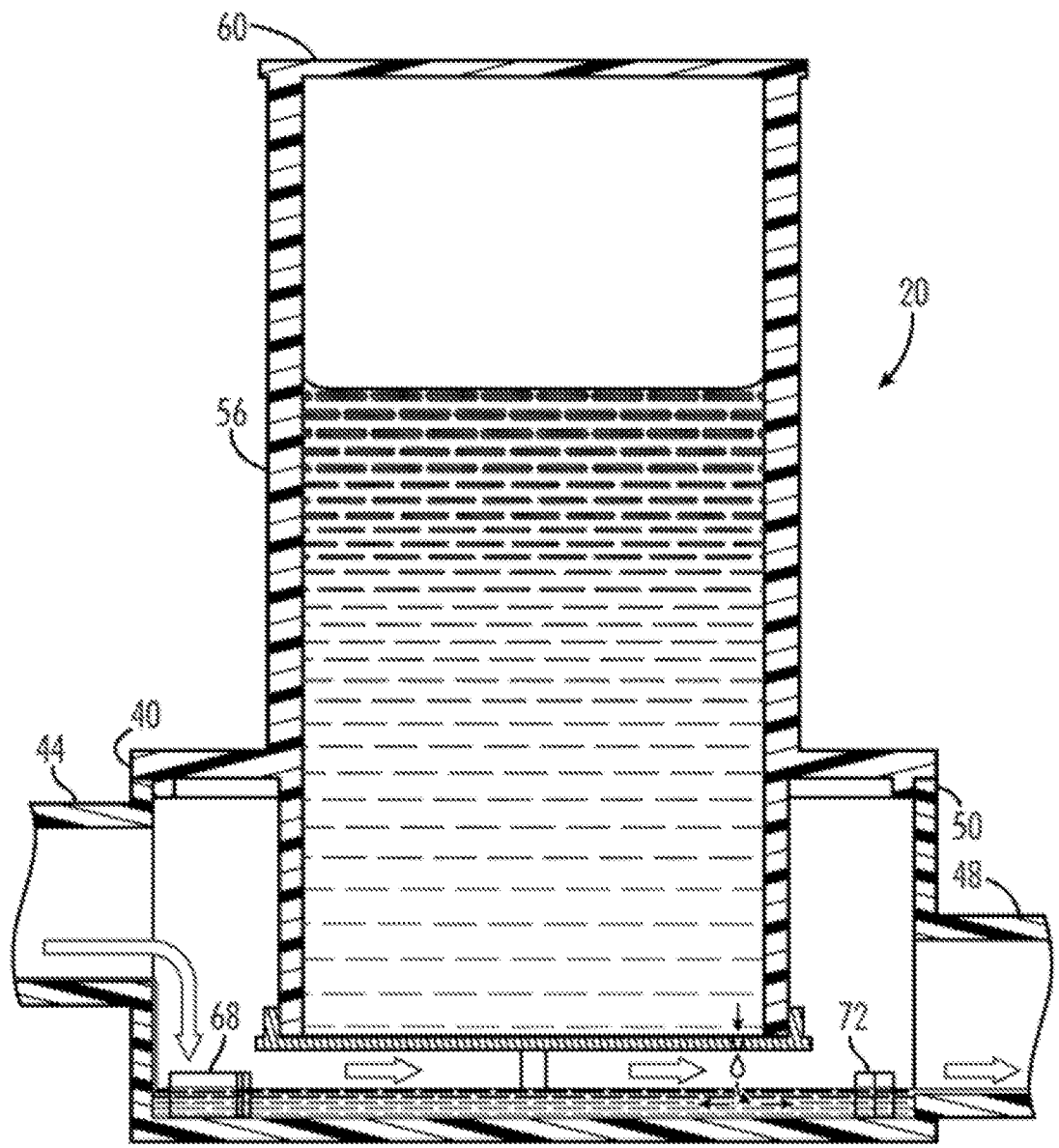
FIG. 4B is an alternative view of the device shown in FIG. 4A wherein the algaecide is a liquid and the dispensing of the algaecide is through a weep hole at the bottom of the feed channel.

A feed channel 56 communicates with the interior 52 of reaction chamber 24 and extends above it. Feed channel 56, which may include a lid 60 and a reaction chamber cap 42, is dimensioned to receive a charge of algaecide 58 that is a solid or semisolid, as seen in FIG. 4A, or a liquid, as seen FIG. 4B. Algaecide 58, when placed in feed channel descends until it touches floor 54 of device 20 at which point it extends beyond the bottom of feed channel 56 and onto reaction chamber 24 so as to react with the condensate that crosses floor 54 of reaction chamber 24 from inlet 44 to outlet 48 and reacts with the algae in that condensate. The algae that are killed are rendered unable to bind with other algae and form clumps that could plug condensation drain line 32.

Reaction chamber 24 may include diverters 68 for controlling the direction and for slowing the movement of condensate through reaction chamber 24 from inlet 44 across reaction chamber 24 though outlet 48, to facilitate the engagement of the moving condensate with the bottom of algaecide 58.

At inlet 44 of the reaction chamber 24, condensate is guided by inlet diverters 68 that channel condensate flow toward algaecide 58 which has descended feed channel 56 and rests on the floor 54 of reaction chamber 24. Algaecide 58 is positioned in reaction chamber 24 to receive the flow of the condensate from inlet diverters 68. As the condensate interacts with algaecide 58, a portion of algaecide 58 mixes with the condensate and reacts with algae in the condensate. As it does, additional algaecide 58 moves to rest on floor 54 and engage the continued flow of condensate. The algae in the condensate reacts with algaecide 58 as it continues to move toward outlet 48. An outlet diverter 72 slows the condensate in order to facilitate the completion of the interaction between algaecide 58 and condensate. The condensate then passes through outlet 48 of reaction chamber 24.

Additional algaecide 58 may be added from time to time to feed channel 56. It may be added, for example, by placing a quantity in the form of a solid "stick" or block periodically into feed channel where the algaecide stick descends by gravity into position engaging floor 54 of reaction chamber 24 where the lowest portion of algaecide 58 makes contact with the flow of condensate and is consumed by the reaction with the algae. As algaecide 58 is consumed, algaecide 58 continues its decent. Algaecide 58 can continue to react with the algae in the condensate for a period of time, which may be days or weeks, or a month. Periodically then, algaecide 58 feed channel 56 will need to be replenished simply by inserting a charge of algaecide 58 into feed channel 56.

Algaecide may be in the form of a solid prism, as shown, in FIGS. 1A, 1B, and 1C, or be a rod or rectangular parallelepiped that conforms to the shape of its feed channel 56, where it descends easily and the extent of its depletion will be obvious on inspection. Feed channel 56 may have a cap 60.

The long dimension of the algaecide in the form of a stick or rod may then conveniently serve as a measure of rate of use (as the equivalent of sand in an hour glass), to measure the time left before the stick is consumed and will need to be replaced. The cross sectional area will be the interaction area with the condensate forwarded by the flow from the inlet diverters. Outlet diverter 72 in part cooperates with inlet diverters 68 to urge condensate to react with algaecide. A modest amount of calculation and experimentation will enable those of ordinary skill to coordinate the size, number and spacing of inlet diverters 68 and outlet diverter 72, the relative heights of inlet 44 with respect to outlet 48 and cross section and height of feed channel 56 required to reduce the algae population of a typical condensate flow in different environments to prevent algae agglomeration and plugging of condensate lines.

A cap 60 on feed channel 56 allows algaecide 58 to remain clean. On removal of cap 60, a user can, by observing the extent algaecide 58 has been depleted by how far from the cap 62 of feed channel 56 algaecide 58 descended since feed channel 56 was last filled, determine the approximate rate of use. Optionally, feed channel 56 may be marked with gradations to permit a more precise estimation of days remaining until replacement algaecide 58 will be needed.

Algaecide 58 may be in a solid or a liquid form. A mild acid such as a chlorine ($ClO_2$), such as "pool" chlorine can be obtained in solid form such as a stick, a rod, or a powder; or alternatively, algaecide 58 may be a liquid acid such as vinegar (CH3COOH), or it may be a proprietary, biodegradable, algae-controlling compound, or a combination of algaecides. A combination of liquid chlorine and vinegar, for example, may be used provided care is taken. Also, algaecide 58, if in solid form, may be shaped so as to increase exposure to the condensate, such as by having a spiral exterior groove or vertical channels.

Figure 6A:
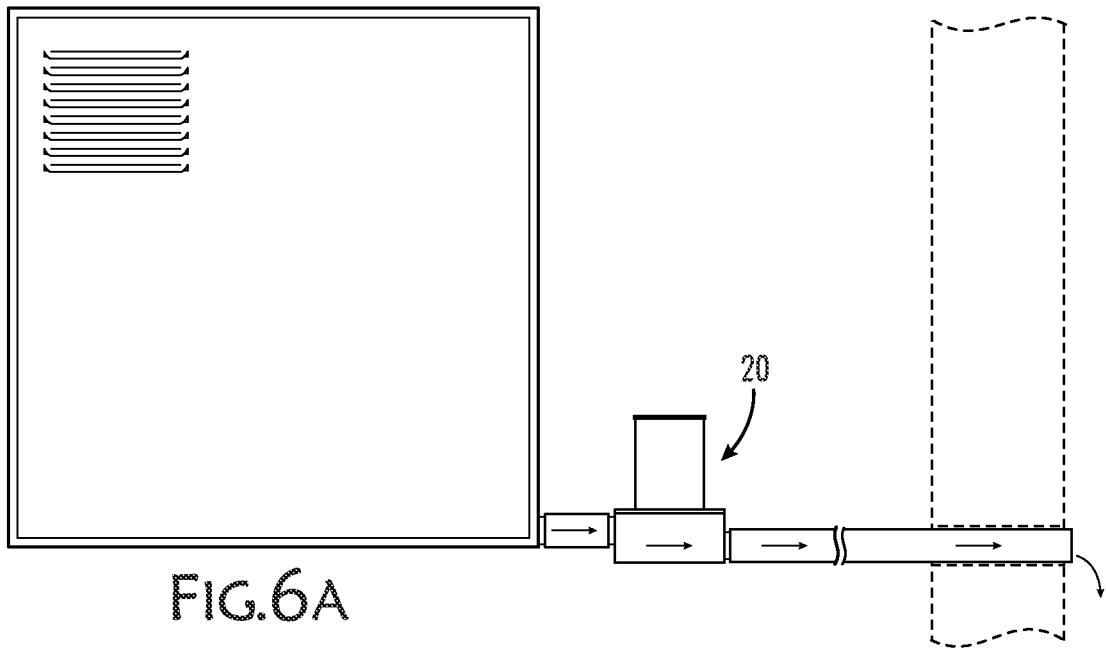
FIGS. 6A and 6B show two potential, alternative arrangements for locating the present device with respect to the condensate drain line, in FIG. 6A of which, the device is added near the beginning of the condensate line, adjacent the appliance that produces the condensate, and FIG. 6B, the device is added closer to the end of the condensate line.
Figure 6B:
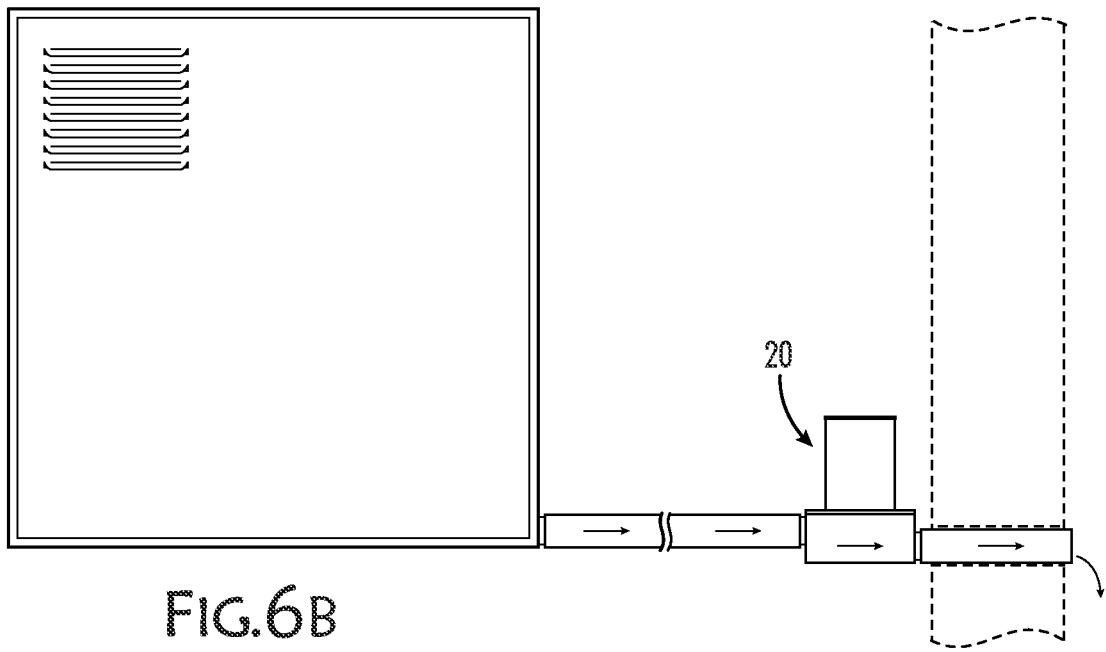

In use, device 20 is first attached to a condensate drain line 32. Device 20 may be attached to the end of condensate line nearest to the source of the condensate as shown in FIG. 6A, or may be inserted at another location if that location provides easy access to device 20.

Inserting device 20 in a condensate drain line 32 running from the appliance that generates the condensate requires drain line 32 to be cut in order to insert device 20. The upstream end at that cut is then attached to inlet 44 of device 20. The downstream end at the same cut is then attached to the outlet 48 of device 20.

Once in use, feed channel 56 of device 20 may be checked periodically, more often during in wet humid weather and less often in cooler dryer weather, to determine the rate at which algaecide is being depleted. The connections and general functioning the device 20 should also be checked. In apartment complexes, feed channels 56 for device 20 may be simply topped up periodically with algaecide 58. Device 20 may be inspected for connections, during which inspection, cap 60 is removed and feed channel 56 is inspected for depletion of algaecide 58.

Those skilled in the maintenance of drain lines will appreciate, from a careful reading of the foregoing detailed description, many advantages of the feature described and the many savings in time and effort to manage multiple drain line, particularly in warmer, moister climates where air conditioning is widely used.

What is claimed is:

1. A device, comprising:
    a reaction chamber having a floor, an inlet wall, an outlet wall, a first side wall and a second side wall, wherein the floor, the inlet wall, the outlet wall and the first side wall and second side wall define an interior of said reaction chamber;
    a chamber inlet defined in the inlet wall of the reaction chamber adapted to provide a flow of condensate from outside said inlet wall to enter the reaction chamber;
    a chamber outlet defined in said outlet wall and leading out of said reaction chamber, said chamber outlet being spaced apart from said chamber inlet, said floor of said reaction chamber being between said chamber inlet and said chamber outlet, said chamber inlet and said chamber outlet of said reaction chamber being dimensioned to connect to a condensate inlet line and a condensate outlet line for receiving said flow of condensate into said chamber inlet, said flow of condensate continuing across said floor of said reaction chamber, and out of said chamber outlet;
    an algaecide disposed in said reaction chamber and positioned with respect to said floor of said reaction chamber to interact with said condensate entering said reaction chamber via said chamber inlet and flowing across said floor of said reaction chamber from said chamber inlet to said chamber outlet;
    first inlet flow diverter and a second inlet flow diverter, each being positioned to direct movement of said flow of condensate toward a mid-point of a first side of said algaecide; and,
    an outlet flow diverter affixed to said floor of said reaction chamber so that said outlet flow diverter is disposed between said algicide and said chamber outlet, wherein said outlet flow diverter has a width that is less than the diameter of the chamber outlet and said outlet flow diverter is positioned within said reaction chamber so that said width does not extend past said chamber outlet and does not touch said first side wall and said second sidewall so that condensate that flows past said outlet flow diverter may flow into said chamber outlet without obstruction by said outlet wall.

2. The device of claim 1, further comprising a feed channel extending into said reaction chamber, said feed channel having an opening therethrough, and said algaecide being dimensioned to fit inside said feed channel.

3. The device of claim 1, said algaecide, having a first side and being dissolvable in said condensate, wherein the first side has a larger surface than an opposite side included in said algaecide.

4. The device of claim 1, wherein said algaecide is selected from the group consisting of chlorine, calcium hypochlorite, acid, and any combination thereof.

5. The device of claim 1, said algaecide being a liquid and a feed channel in fluid communication with the reaction chamber and including a bottom with a weep hole leading to said floor of said reaction chamber for said liquid to drip through.

6. The device of claim 1, wherein said algaecide is a prism shape algaecide, and the reaction chamber includes a feed channel in fluid communication with said reaction chamber and dimensioned to accept said prism shape algaecide and including a bottom with an opening leading to said floor of said reaction chamber dimensioned to allow said prism shape algaecide to contact and rest in the floor of the reaction chamber.

7. The device of claim 6 where said prism shape algaecide includes a triangular cross section and said feed channel is dimensioned to position a lateral face of said prism shape algaecide towards the chamber inlet and an edge of said prism shape algaecide towards the chamber outlet.

8. The device of claim 1, wherein said first inlet flow diverter and said second inlet flow diverter each have a long axis that is perpendicular to said floor and is positioned so that said long axis is not perpendicular to said flow of condensate from said chamber inlet.

9. The device of claim 1, said outlet flow diverter being dimensioned and spaced in relation to said chamber outlet of said reaction chamber and said algaecide to slow a movement of condensate away from said chamber outlet.

10. The device of claim 1, said outlet flow diverter directing flow of said condensate from said reaction chamber away from said chamber outlet.

11. The device of claim 1, said inlet flow diverter being oriented to direct said condensate toward said algaecide wherein the inlet flow diverter is adapted to increase an interaction between said condensate and said algaecide.

12. The device of claim 2, including a cap removably carried by said feed channel.

13. The device of claim 1 wherein the inlet flow diverter is adapted to redirect the flow of the condensate toward a lateral face of the algaecide.

14. A device, comprising:
a reaction chamber having a floor, a first side wall, a second side wall and an outlet wall;
a chamber inlet defined in said reaction chamber positioned at a first distance above the floor;
a chamber outlet defined in said reaction chamber positioned at a second distance above the floor wherein the first distance is higher than the second distance and a first flow into the reaction chamber from the chamber inlet is parallel to a second flow out of the reaction chamber through the chamber outlet;
an algaecide positioned in said reaction chamber and adapted to interact with a condensate entering said reaction chamber flowing across said floor;

an inlet flow diverter disposed under the chamber inlet that is positioned adjacent to the chamber inlet so that said inlet flow diverter directs movement of said condensate toward a mid-point of a first side of said algaecide; and, an outlet flow diverter attached to the reaction chamber and does not touch both said first side wall and said second side wall and has a width that is less than the width of said outlet wall, said outlet flow diverter being positioned adjacent to said chamber outlet and adapted to direct at least a portion of said second flow of the condensate away from said chamber outlet.

15. The device of claim 14 wherein said inlet flow diverter has a long axis that is perpendicular to said floor and is positioned so that the angle between said long axis and said first flow of condensate is less than 90 degrees.

16. The device of claim 15 wherein the set of inlet flow diverters are adapted to slow the movement of condensate in the reaction chamber.

17. A device, comprising:

a reaction chamber having a floor and a side wall;

a chamber inlet defined in said reaction chamber operatively associated with an inlet flow diverter, said inlet flow diverter being attached to the reaction chamber and completely disposed under the chamber inlet, wherein said inlet flow diverter has a long axis that is perpendicular to said floor and is positioned so that the angle between said long axis and said flow of condensate from said chamber inlet not perpendicular so that said inlet flow diverter funnels said flow of condensate toward an algaecide disposed in said reaction chamber; and, a chamber outlet defined in said reaction chamber operatively associated with an outlet flow diverter that does not touch said side wall so that said outlet flow diverter obstructs at least a central portion of said chamber outlet and directs at least a portion of said flow of condensate away from said central portion of said chamber outlet.

18. The device of claim 17 wherein the outlet flow diverter is positioned at an outlet angle relative to a long axis of the outlet flow diverter and an outlet wall defined in the reaction chamber.

19. The device of claim 17 wherein the inlet flow diverter is positioned to direct movement of the condensate toward a lateral face of said algaecide.

20. The device of claim 17 wherein the inlet flow diverter extends upward from the floor.

21. The device of claim 17 wherein the outlet flow diverter extends upward from the floor.

* * * * *